United States Patent
Alaman Aguilar et al.

(10) Patent No.: US 11,468,804 B2
(45) Date of Patent: Oct. 11, 2022

(54) HOUSEHOLD APPLIANCE COMPONENT

(71) Applicant: BSH HAUSGERAETE GMBH, Munich (DE)

(72) Inventors: Jorge Alaman Aguilar, Saragossa (ES); Raquel Alicante Santiago, Saragossa (ES); Carlos Gimeno Asin, Saragossa (ES); Jose Ignacio Pena Torre, Saragossa (ES); Carlos Sanchez Somolinos, Saragossa (ES)

(73) Assignee: BSH Hausgeraete GmbH, Munich (DE)

( * ) Notice: Subject to any disclaimer, the term of this patent is extended or adjusted under 35 U.S.C. 154(b) by 400 days.

(21) Appl. No.: 16/621,431

(22) PCT Filed: Jun. 8, 2018

(86) PCT No.: PCT/IB2018/054151
§ 371 (c)(1),
(2) Date: Dec. 11, 2019

(87) PCT Pub. No.: WO2018/234918
PCT Pub. Date: Dec. 27, 2018

(65) Prior Publication Data
US 2021/0142701 A1    May 13, 2021

(30) Foreign Application Priority Data
Jun. 22, 2017 (ES) ................ ES201730825

(51) Int. Cl.
*G02F 1/315* (2006.01)
*G09F 23/00* (2006.01)
(Continued)

(52) U.S. Cl.
CPC ........... *G09F 23/0058* (2013.01); *C09D 4/00* (2013.01); *C09K 19/04* (2013.01); *G02B 6/006* (2013.01);
(Continued)

(58) Field of Classification Search
CPC ........ G09F 23/0058; G09F 9/35; G09F 13/18; G09F 13/20; H05B 6/1218; C09D 4/00;
(Continued)

(56) References Cited

U.S. PATENT DOCUMENTS 5,448,036 A    9/1995   Husslein et al.
9,170,008 B2  10/2015   Reul et al.
(Continued)

FOREIGN PATENT DOCUMENTS

CN    1588502 A      3/2005
CN    101641618 A    2/2010
(Continued)

OTHER PUBLICATIONS

M. Sangermano et al.: "Preparation and characterization of hybrid nanocomposites coatings by photopolymerization and sol-gel process", Polymer, 2005, pp. 11241-11246, vol. 46, Politecnico Di Torino, Torino, Italy.
(Continued)

*Primary Examiner* — Ruiyun Zhang
(74) *Attorney, Agent, or Firm* — Laurence A. Greenberg; Werner H. Stemer; Ralph E. Locher

(57) ABSTRACT

A household appliance component has a base element with at least one photoluminescent layer and at least one light guide. The light guide is configured to couple in and transmit light containing at least one excitation wavelength of the photoluminescent layer to the photoluminescent layer. An optical switch is assigned to the light guide to route light coupled in the light guide depending on the temperature of
(Continued)

the optical switch. Further a household appliance contains the at least one household appliance component.

21 Claims, 5 Drawing Sheets

(51) Int. Cl.
    *G09F 9/35*     (2006.01)
    *C09K 19/04*     (2006.01)
    *F21V 8/00*     (2006.01)
    *C09D 4/00*     (2006.01)
    *G09F 13/18*     (2006.01)
    *G09F 13/20*     (2006.01)
    *G02F 1/01*     (2006.01)
    *H05B 6/12*     (2006.01)

(52) U.S. Cl.
    CPC ............ *G02F 1/0147* (2013.01); *G02F 1/315* (2013.01); *G09F 9/35* (2013.01); *G09F 13/18* (2013.01); *G09F 13/20* (2013.01); *C09K 2019/0448* (2013.01); *C09K 2323/03* (2020.08); *H05B 6/1218* (2013.01)

(58) Field of Classification Search
    CPC ....... G02B 6/006; G02F 1/315; G02F 1/0147; C09K 19/04; C09K 2019/0448; C09K 2323/03
    USPC ...................................... 361/679.01; 428/1.3
    See application file for complete search history.

(56) References Cited

U.S. PATENT DOCUMENTS

| | | | |
|---|---|---|---|
| 9,507,215 | B2 | 11/2016 | Choi et al. |
| 9,664,375 | B2 | 5/2017 | Guiset et al. |
| 2002/0001431 | A1 | 1/2002 | Yonekubo |
| 2014/0204449 | A1 | 7/2014 | McCarthy et al. |
| 2015/0285982 | A1 | 10/2015 | Coe-Sullivan et al. |
| 2017/0027379 | A1 | 2/2017 | Millett |

FOREIGN PATENT DOCUMENTS

| | | |
|---|---|---|
| CN | 103680343 A | 3/2014 |
| CN | 104252066 A | 12/2014 |
| CN | 104347004 A | 2/2015 |
| CN | 204244214 U | 4/2015 |
| DE | 102015207569 A1 | 10/2016 |
| GB | 2186109 A | 8/1987 |
| WO | 2012059664 A1 | 5/2012 |

OTHER PUBLICATIONS

Wenxiu Que and X. Hu: "Sol-Gel Derived Titania/-Glycidoxypropyltrimethoxysilane and Methyltrimethoxysilane Hybrid Materials for Optical Waveguides", Journal of Sol-Gel Science and Technology, 2003, pp. 319-325, vol. 28, Nanyang Technological University.

J. V. Crivello; J. H. W. Lam: "Triarylsulfonium salts as photoinitiators of free radical and cationic polymerization", 1979, pp. 759-764, vol. 17, General Electric Corporate Research and Development Center.

R. Muller et al.: "SU8 polymer materials used in integrated optic microsystems", Optoelectronics and Advanced Materials—Rapid Communications, 2010, pp. 228-233, vol. 4, No. 2, National Institute for R&D in Microtechnologies.

K. Gut; S. Drewniak: "The Waveguide Structure Based on the Polymer SU8 on a SiO/Si Substrate", ACTA Physica Polonica A, 2011, pp. 630-634, vol. 120, No. 4, Silesian University of Technology.

HOUSEHOLD APPLIANCE COMPONENT

BACKGROUND OF THE INVENTION

Field of the Invention

The invention relates to a household appliance component and to a household appliance comprising at least one household appliance component. More particularly, the invention relates to a household appliance component having a base element with at least one photoluminescent layer and at least one light guide, wherein the light guide is configured to couple in and transmit light comprising at least one excitation wavelength of the photoluminescent layer to said photoluminescent layer, and to a household appliance comprising at least one such household appliance component.

Many household appliances need to use light effects as visual alerts or design features. The use of illumination is in other words required as a safety measure on the one hand and as an important user interaction means and design element to generate indicators or attractive effects on the other hand. Therefore household appliances and household appliance components are usually provided with illumination devices such as light bulbs or LEDs to illuminate certain areas in a desired way.

However, these technologies have limitations in terms of power supply, installation space, temperature resistance, and chemical resistance so that it is often difficult or impossible to integrate these illumination devices in certain household appliance components such as for example cooktops, ceramic hobs, ovens, microwaves, freezers, dishwashers, washing machines, or dryers.

The publication GB 2 186 109 A describes a domestic electrical appliance provided with indicating means for optical indication of an operational state of the appliance, the indicating means comprising an optical conductor which at least in part has the form of at least one symbol to be indicated, and illuminating means to supply light to the conductor for illumination of the or each symbol. In an embodiment, the conductor is arranged at an at least substantially light-impermeable masking element that is a substantially planar plate, especially an indicating panel of the appliance.

The properties of hybrid materials, i.e. of materials which combine structural units of different classes of materials at the molecular level, with respect to the use of them for the guidance of light and/or their influence on optical properties are discussed for example in the following scientific papers:

M. Sangermano et al, "Preparation and characterization of hybrid nanocomposites coatings by photopolymerization and sol-gel process", Politecnico di Torino (2005).

Wenxiu Que and X. Hu, "Sol-Gel Derived Titania/γ-Glycidoxypropyltrimethoxysilane and Methyltrimethoxysilane Hybrid Materials for Optical Waveguides", Nanyang Technological University (2003).

J. V. Crivello and J. H. W. Lam, "Triarylsulfonium salts as photoinitiators of free radical and cationic polymerization", General Electric Corporate Research and Development Center (1979).

R. Müller et al., "SU8 polymer materials used in integrated optic microsystems", National Institute for R&D in Microtechnologies (2009).

K. Gut and S. Drewniak, "The Waveguide Structure Based on the Polymer SU8 on a $SiO_2$/Si Substrate", Silesian University of Technology (2011).

SUMMARY OF THE INVENTION

Against this background it is an object of the present invention to provide a household appliance component, which is able to generate illuminations in a more flexible way and with less installation space required and which is able to indicate very high and/or very low temperatures. A further task of the present invention is to provide a household appliance comprising such a household appliance component.

These tasks are solved by a household appliance component with the features of the first independent claim and by a household appliance with the features of the second independent claim. Advantageous developments of the invention are specified in the respective dependent claims, wherein advantageous developments of the first aspect of the invention are to be regarded as advantageous developments of the second aspect of the invention and vice versa.

A first aspect of the invention relates to a household appliance component, which according to the invention has a base element with at least one photoluminescent layer and at least one light guide, wherein the light guide is configured to couple in and transmit light comprising at least one excitation wavelength of the photoluminescent layer to said photoluminescent layer. The household appliance component according to the invention comprises in other words a combination of a light guide together with a photoluminescent coating, which is applied to a base element or substrate of said household appliance component, to generate visual effects. The light guide can also be denoted as an optical waveguide and is a physical structure that guides electromagnetic waves in the optical spectrum comprising at least one excitation wavelength of the photoluminescent layer. This allows for a very flexible illumination of the household appliance component, wherein the light source and the light emitting photoluminescent layer, which are optically connected via the light guide, can be at any desired distance from each other, so that the type of light source as well as the necessary power supply of said light source are freely selectable and arrangeable. This is of great advantage for household appliance components where it is not possible or desirable to place the light source for reasons of lacking installation space or temperature or chemical exposure directly at the necessary location. Instead, the light source can be placed on one side of the light guide, which will transmit the light to the photoluminescent layer. The photoluminescent layer is then excited by photons and will emit light of a certain wavelength. This gives the possibility of providing the household appliance component with any kind of—possibly homogeneous—illumination, wherein the photoluminescent layer or coating has extremely little space requirement. The household appliance component can for example be a display device, a cooktop, a ceramic hob or the like.

In the present invention, an optical switch is assigned to the light guide to route light coupled in the light guide depending on the temperature of the optical switch, i.e. to selectively route light coupled in the light guide. The optical switch may for example be a passive optical switch without optical gain elements, an active optical switch having optical gain elements, or an all-optical switch in which the actuating signal is also optical.

In a further advantageous embodiment of the invention it is provided that the optical switch comprises at least one liquid crystal polymer. Liquid crystal polymers react particularly sensitive to physical changes, show a swift response in sub-microseconds, and good transparency over a broad spectral range from the visible to the infrared.

In the present invention it is provided that the optical switch is configured to route the coupled-in light depending on the temperature of the optical switch. Thus the luminescent light emission can be made dependent on the temperature of the optical switch and used to indicate very high and/or very low temperatures. If the optical switch is for example arranged on the light guide, the optical switch or optical switch material can be translucent at lower temperatures so that the coupled-in light will reach the optical switch and will be diffused and coupled out of the light guide so that no excitation of the photoluminescent layer can occur even if the light source is active. On the other hand, if the temperature is high, the optical switch can become transparent so that the light will be transmitted by the light guide, the photoluminescent layer will be excited and will emit light. In other words, the optical switch will act as a transmission switch for the guided light due to the change of its transmission properties depending on the temperature. In this way, an emission intensity dependence of the photoluminescent layer with temperature (WARM: high intensity emission, COLD: low or no emission) can be achieved without the need to bring the photoluminescent layer in contact with particularly hot or cold areas. In this manner, exposition of the luminescent dye to high or low temperatures that could accelerate degradation is avoided. In addition, hot or cold areas of the household appliance component can be covered (e.g.: by a pot) and therefore not be visible for the user/viewer so that a certain distance between the hot region (covered) and the luminescent mark (uncovered) is of advantage.

In an advantageous embodiment of the invention it is provided that the light guide is configured as a planar waveguide, in particular as a slab waveguide. Planar waveguides also have extremely little space requirement. A slab waveguide, which is a preferred variant of a planar waveguide, generally consists of three layers of materials with different dielectric constants, extending in parallel directions. Light may be confined in the middle layer by total internal reflection. This occurs if the dielectric index of the middle layer is larger than that of the surrounding layers. Guided modes of a slab waveguide cannot be excited by light incident from the top or bottom interfaces so that light can be injected from the side into the middle layer under controlled conditions. Alternatively a coupling element may be used to couple light into the waveguide, such as a grating coupler or prism coupler.

In a further advantageous embodiment of the invention it is provided that the light guide is a light guide element which is coupled to the base element. The light guide and the base element thus form a common unit or assembly. It can also be provided that at least a part of the base element is the light guide. This allows for a significantly low installation space requirement. Also, the light guide is very robust. Alternatively or additionally it is provided that the light guide is a light guiding layer of the base element. The light guide in other word is at least partially a layer or coating of the base element which also allows for a significantly low installation space and a high flexibility regarding the optical and geometrical properties of the light guide.

In a further advantageous embodiment of the invention it is provided that the photoluminescent layer forms at least a part of the light guiding layer. This can for example be achieved by dissolving or mixing one or more photoluminescent dyes in the light guiding layer to generate photoluminescent effects with significantly low installation space requirements. These photoluminescent dyes, when they are excited by an external light source, generally emit light with longer wavelengths compared to the wavelength of the excitation light.

Alternatively or additionally it is provided that the light guiding layer is produced by at least one coating method, in particular by at least one of spin coating, spray coating, dip coating, serigraphy, and inkjet printing. The light guide in other words is formed as a layer or coating and can be deposited or generated by one or more of the above-mentioned methods. Spin coating, dip coating, or serigraphy can for example be advantageously used if a rather large portion of the surface or the entire surface of the base element should be provided with light guiding abilities. On the other hand, inkjet printing can be also used to generate the light guiding layer in a very flexible way by controlled and selected deposition of respective light guiding material in order to guide light along a specific path. Inkjet printing or coating allows for a fast and easy recreation of complex geometries by propelling droplets of a suitable ink onto the surface of the base element of the household appliance component.

In a further advantageous embodiment of the invention it is provided that the photoluminescent layer is produced by at least one coating method, in particular by at least one of spin coating, spray coating, dip coating, serigraphy, and inkjet printing. The photoluminescent layer in other words is formed as a layer or coating and can be deposited or generated by one or more of the above-mentioned methods. Spin coating, dip coating, or serigraphy can for example be advantageously used if a rather large portion of the surface or the entire surface of the base element should be provided with illumination abilities. On the other hand, inkjet printing can be also used to generate the photoluminescent layer in a very flexible way by controlled and selected deposition of respective photoluminescent material in order to emit light in a certain geometric pattern. It can also be provided that the photoluminescent layer and the light guiding layer are produced together or separately by at least one coating method.

In a further advantageous embodiment of the invention it is provided that the light guide has a higher refractive index than adjacent material along its waveguide path. This allows for particular good light guiding properties. The refractive indices of the light guide and the adjacent material are generally measured at a wavelength of 633 nm and at a temperature of 20° C. However, it can also be provided that the refractive indices are measured at the at least one excitation wavelength of the photoluminescent layer. In case of being in contact with air, the refractive index n of the light guide is for example higher than 1 ($n_{air}$=1 at 633 nm). If the light guide is deposited over or in contact with a base element made of ceramic glass, which is used for cooktop surfaces, the refractive index n of the light guide is for example chosen to be higher than approximately 1.54 ($n_{glass}$=1.54 at 633 nm).

In a further advantageous embodiment of the invention it is provided that the light guide is at least partly arranged on a cladding layer and/or at least partly arranged between two cladding layers and/or at least partly embedded in the cladding layer and/or at least partly arranged between the base element and the photoluminescent layer and/or at least partly arranged between the cladding layer and the photoluminescent layer. A cladding layer can advantageously be used to decrease and/or increase the refractive index of the adjacent material of the light guide in order to improve its light guiding properties. For example, the refractive index of glass cannot be easily changed or decreased but, by using a cladding layer as an intermediate layer between a base element made out of glass and a light guide with a relatively lower refractive index, suitable pairs of refractive indices are ensured. The light guide may be deposited on top of the cladding layer so that both, air and cladding layer as the adjacent materials will have a lower refractive index than the light guide so that coupled-in light can be guided without relevant losses. By arranging the photoluminescent layer directly on top of the light guide, a very compact assembly with high quantum efficiency can be established.

In a further advantageous embodiment of the invention it is provided that the base element and/or the photoluminescent layer and/or the light guide and/or the cladding layer is transparent to light of the visible wavelength and/or comprises or consists of a hybrid polymer. Transparency is to be regarded as the physical property of allowing light to pass through the material without being substantially scattered. This allows for a very flexible, discrete, and unobtrusive embodiment of one or more of the base element, the photoluminescent layer, the light guide, and the cladding layer. Further, if the photoluminescent layer is excited and emits light, the emitted light can pass through adjacent transparent material, e.g. the base element and/or the light guide and/or the cladding layer, and can thus be seen through other elements of the household appliance component.

Hybrid polymers are to be understood as polymeric materials which combine structural units of different classes of materials at the molecular level. Hybrid polymers may thus have very flexible properties and can be adjusted in an optimum manner to the respective embodiment of the household appliance component. In contrast to composite materials, which are defined by phase boundaries and weak interactions between the phases, the structural units of hybrid polymers are linked at the molecular level and can comprise inorganic and organic structural elements.

This may be achieved by chemical methods such as sol-gel reactions. Hybrid polymers extend the scope of classical composite materials and are the basis for a required multifunctionality of materials.

In a further advantageous embodiment of the invention, the hybrid polymer is obtainable by polymerisation of a reaction mixture comprising an alkoxysilane with an epoxy group.

In a further advantageous embodiment of the invention, the hybrid polymer is obtainable by polymerisation of a reaction mixture comprising in % by weight the following chemical compounds:
  1-99% 3-glycidyloxypropyltrimethoxysilane (GLYMO)
  0, 1-5%, preferably 0, 1 to 3% and most preferably 0, 1 to 2, 5%, photoacid generator, in particular a triarylsulphonium salt
  0-2% surfactant, in particular BYK-333
  0-70% refractive index increasing compound, in particular SU8 and/or diphenyl dimethoxysilane
  0-10% photoluminescent material, in particular Rhodamine B
  0-10% additive.

If the hybrid polymer is used in the light guide, the photoluminescent material content is preferably 0% by weight. Moreover, if the hybrid polymer is used in the cladding layer, the photoluminescent material content and the refractive index increasing compound content are preferably 0% by weight.

It goes without saying that the weight fractions of all components of the hybrid polymer always add up to 100%. The presence of the epoxy group in the GLYMO, having the formula

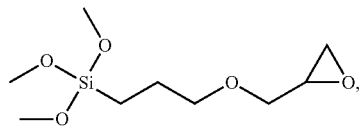

offers fast curing properties, while the silane group provides excellent adhesion properties on different base elements, especially base elements made of glass. Further, the hybrid polymer has a high resistance against extreme chemical and thermal conditions. The hybrid polymer may therefore be advantageously used in many different ways and embodiments. It can for example be used as a base ink due to its hybrid properties. By using a certain weight fraction of the photoacid generator (PAG), a curing process in one step is possible by applying UV light to the hybrid polymer mixture, i.e. the reaction mixture to be polymerized. In this case, the alkoxysilae with an epoxy group, for example GLYMO, reacts with the photoacid generator or photoinitiator since acid is generated so that both processes, polymerization of the epoxy groups and hydrolysis and condensation of the silanes, are initiated at the same time. Therefore, organic/inorganic networks and coatings can be created by curing the hybrid polymer with UV light. The photoacid generator may comprise or be triarylsulphonium hexafluorophosphate salt having the formula

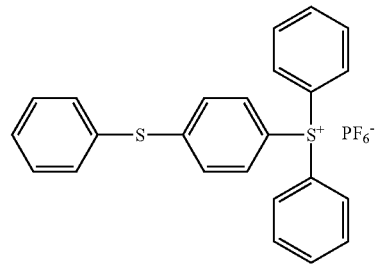

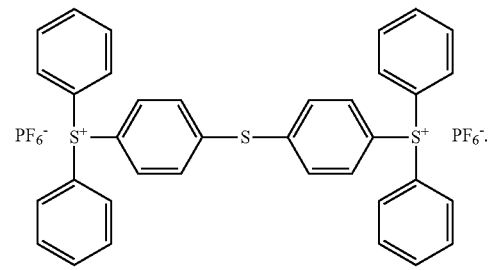

In order to adjust the rheological properties of the hybrid polymer mixture, between 0-2%, in particular between 0.05-0.1% of a surfactant can be used. An example of a suitable surfactant is BYK-333 (silicone-containing surface additive for surface tension reduction) from Altana AG. Other surfactants can generally be used as well. In order to increase the refractive index of the hybrid polymer, one or more refractive index increasing compounds can be added to the formulation such as for example SU8, an epoxy oligomer having the formula.

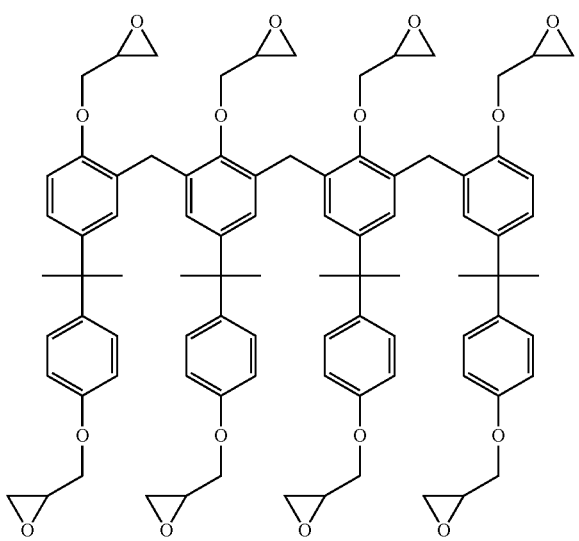 [SMILES: CC(C)(c1ccc(OCC2CO2)cc1)c1ccc(OCC2CO2)c(Cc2cc(C(C)(C)c3ccc(OCC4CO4)cc3)cc(Cc3cc(C(C)(C)c4ccc(OCC5CO5)cc4)cc(Cc4cc(C(C)(C)c5ccc(OCC6CO6)cc5)ccc4OCC4CO4)c3OCC3CO3)c2OCC2CO2)c1]

The use of SU8 helps to increase the refractive index without negative impact on the mechanical properties of the hybrid polymer. For example, the refractive index of the hybrid polymer can be adjusted between approximately 1.5 and approximately 1.57 (at 633 nm) by adding from 0% to 70% of SU8, in particular between 0-25%. Apart from SU8, also other materials such as diphenyl dimethoxysilane (DPDMS) can be used in weight fractions ranging between 0% and 70%, preferably between 0-25%, in order to adjust and increase the refractive index and, due to its inorganic component, maintain the mechanical properties of the hybrid polymer. Alternatively or additionally, other refractive index increasing compounds can be used as well. Generally speaking, the presence of ring structures and/or sulphur atoms increases the refractive index of a chemical compound so that the number of ring structures and/or sulphur atoms can be used to adjust the desired refractive index.

It is also possible to use the hybrid polymer for creating the photoluminescent layer by adding one or more luminescent dyes. These dyes, when excited by an external light source, emit light with longer wavelenghts. For example, Rhodamine B is a pink dye that when irradiated with blue-green wavelengths emits red-orange light. Less than 0.1% of Rhodamine B can be used to achieve a printable ink (with inkjet or other technologies) with luminescent properties. The hybrid polymer may thus for example consist of GLYMO, SU8, DPDMS, BYK-333, PAG, and Rhodamine B.

Also, depending on the particular needs, one or more additives can be added to modify the properties of the hybrid polymer. The mixture of the educts of the hybrid polymer is preferably formulated in such a way that the rheological properties of the mixture allow its deposition by inkjet printing and/or by other coating methods. Thus, the mixture of the educts of the hybrid polymer can also be denoted an ink. In any way, if ink jet printing is used the reactive mixture comprising the educts is generally applied via ink jet printing and then the polymerisation occurs.

In a further advantageous embodiment of the invention it is provided that the household appliance component comprises at least one reflecting element which is configured to reflect light emitted by the photoluminescent layer and/or at least one absorption element which is configured to absorb, scatter and/or quench light emitted by the photoluminescent layer and/or at least one decoupling element which is configured to decouple light from the light guide. This allows for a particularly precise adjustment of the light transmission and/or light emission and the resulting illumination effect.

When the optical switch comprises at least one liquid crystal polymer, the optical switch comprises preferably a liquid crystal polymer which is obtainable by copolymerising (a) 10-100% by weight monofunctional mesogen, in particular 6-(4-cyanobiphenyl-4'-yloxy)hexyl acrylate, based on the monomers, and (b) 0-10% by weight difunctional mesogen, preferably a diacrylate, more preferably RM82, based on the monomers, in the presence of a photoinitiator, preferably in an amount of up to 5% by weight, based on the monomers.

This liquid crystal polymer material changes its optical transmission properties between translucent and transparent with temperature and can therefore be used as the optical temperature switch. The temperature-dependent material thus preferably consists of a mixture of reactive monomers comprising a liquid crystal monoacrylate, an optional difunctional liquid crystal diacrylate to crosslink the polymeric system and an optional photoinitiator to trigger the polymerization reaction.

6-(4-cyanobiphenyl-4'-yloxy)hexyl acrylate has the formula

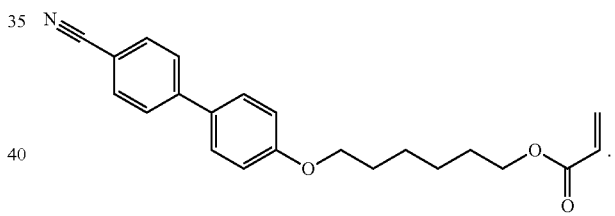

RM82, which may be employed as difunctional reactive mesogen in weight fractions of for example approximately 1%, has the formula

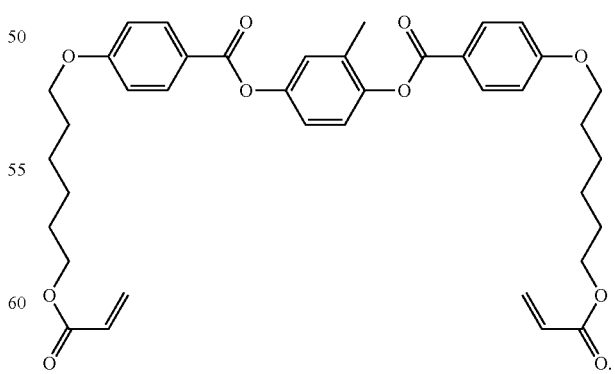

IRG184 (1-Hydroxycyclohexyl phenyl ketone), which may be employed as photoinitiator in weight fractions of for example up to 3%, has the formula

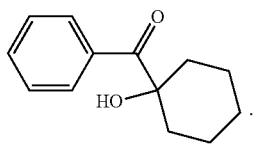 [SMILES: O=C(c1ccccc1)C1(O)CCCCC1]

The mixture may be applied on top of the light guide and UV polymerized in the isotropic state just above the clearing point of the low molecular liquid crystal mixture to promote upon photopolymerization the formation of a highly scattering multidomain texture. The turbid appearance of the optical switch changes to transparent when heated up to approximately 120-130° C. The switching temperature can be changed by modulating the material composition and processing conditions.

A second aspect of the invention relates to a household appliance comprising at least one household appliance component according to the first aspect of the invention. The resulting features and their advantages can be gathered from the description of the first aspect of the invention. It may be envisaged that the household appliance is configured as a cooker, a cooking field, an oven, a microwave oven, a dishwasher, a dryer, a washing machine, a freezer, and/or a steam oven.

The invention is illustrated in the following by discussing specific non-limiting embodiments. Accordingly, the features and feature combinations mentioned below in the embodiments are usable not only in the respectively specified combination, but also in other combinations without departing from the scope of the invention as defined by the appended claims.

In the following, embodiments of the invention are shown in more detail by referring to the drawings. These show in:

DESCRIPTION OF THE INVENTION

Figure 1:
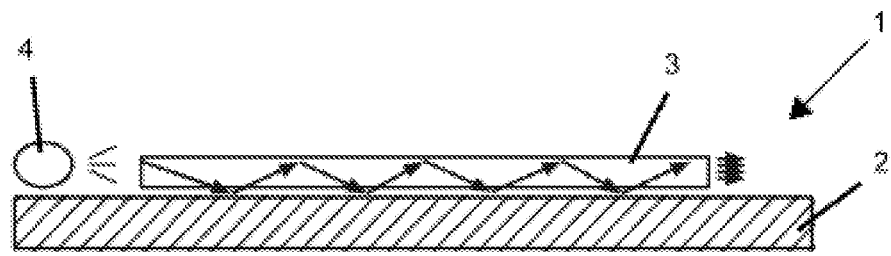
FIG. 1 a schematic sectional view of a first household appliance component according to the state of the art.

FIG. 1 shows a schematic sectional view of a household appliance component 1 according to the state of the art. The household appliance component 1, which is formed as a ceramic cooktop, comprises a base element 2 which is made of glass ceramic. Further, a light guide 3 is arranged on top of the base element 2, wherein the light guide 3 is configured to couple in and transmit light from a light source 4 to a at least one photoluminescent layer 5 (see FIG. 3), wherein the coupled-in light comprises at least one excitation wavelength of the photoluminescent layer 5. The path of the light is generally indicated with arrows. For reasons of clarity the photoluminescent layer 5 is not shown in FIG. 1 and FIG. 2. However, the photoluminescent layer 5 may generally be arranged freely on the base element 2 as long as it can be optically coupled to the light source 4 via the light guide 3. The light source 4 generally is not necessarily part of the household appliance component 1. The light source 4 in general could also be any ambient light source, for example in a kitchen. The combination of the light guide 3 together and the photoluminescent layer or coating 5 allows the generation of visual effects on the substrate or base element 2. The light guide 3 can for example be applied as a coating or can be an independent element as for example a glass slab adjacent to the base element 2 or a combination of both. This coating can be deposited by different methods, depending on the application, for example by spin coating, dip coating, or serigraphy if the whole surface or at least a major part of the surface of the base element 2 is to be provided with waveguiding capabilities. On the other hand, inkjet printing can be used to deposit light guiding material on the base element 2 in order to transmit light along a specific path. It is also possible to use at least parts of the base element 2 itself as the light guide 3. Light can thus be transmitted from one point (i.e. the light source 4) to another point (i.e. the photoluminescent layer 5) through the light guide 3. This is particularly helpful if it is not possible to place the light source 4 directly at the desired location of the household appliance component 1. Instead the light source 4 can be arranged on one side of the base element 2/light guide 3 and transmit the light through the light guide 3 in order to excite the spaced apart photoluminescent layer 5 and create a desired illumination.

Generally it is possible to pretreat any surface of the household appliance component 1 prior to a coating or layering step, for example by ozone, flame, or pyrosil flame treatment, in order to improve the adherence and homogeneity of the respective coating or layer.

Figure 2:
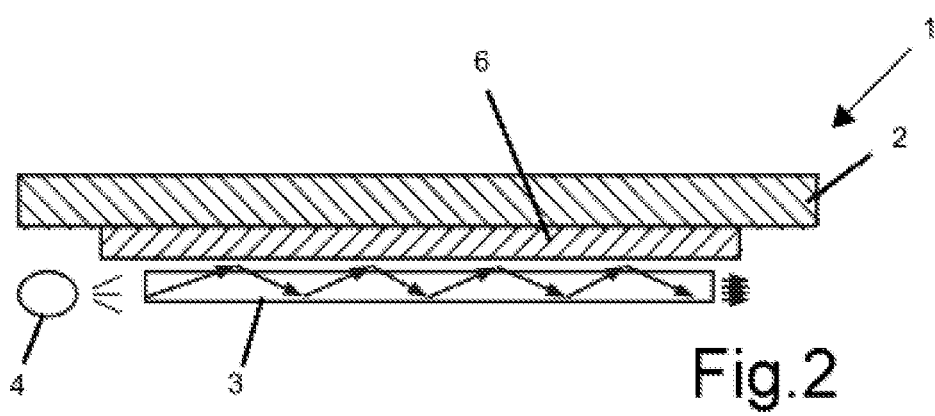
FIG. 2 shows a schematic top view of a household appliance component which is not according to the invention, but whose features can be present in embodiments of the present invention.

FIG. 2 shows a schematic top view of a household appliance component 1 which is not according to the present invention, but whose features can be used in embodiments of the present invention. In contrast to the previous embodiment, the light guide 3 and the light source 4 are arranged on the back side of the base element 2. Further, a cladding layer 6 is arranged between the base element 2 and the light guide 3. In order to have a light guiding effect, the refractive index of the light guide 3 or the light guiding coating 3 needs to be higher than the surrounding mediums. Also light absorption or scattering at wavelengths of interest should be as small as possible. In case of being in contact with air, the refractive index of the light guide 3 needs to be higher than 1 ($n_{air}$=1) which will be the case for any light guiding material. On the other side, if the light guide 3 is directly arranged as a coating on a base element 2 made of ceramic glass that is usually used for induction cooktop surfaces, the refractive index of the light guide 3 needs to be higher than 1.54 ($n_{glass}$=1.54 at 633 nm).

Figure 3:
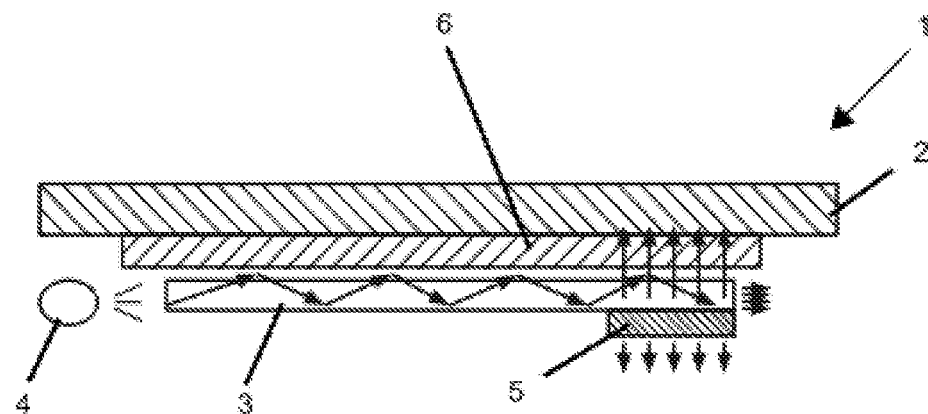
FIG. 3 a schematic sectional view of a household appliance component which is not according to the invention, but whose features can be present in embodiments of the present invention.

FIG. 3 shows a schematic sectional view of the household appliance component 1 which is not according to the invention, but whose features can be used in embodiments of the present invention. The general structure corresponds to the previous example given in FIG. 2. Spaced apart from the light source 4 is the photoluminescent layer 5 which in the present embodiment is deposited or coated on top of a portion of the light guide 3. As an improvement or extra functionality of the above-mentioned ink, photoluminescent dyes can be dissolved in it to generate the photoluminescent layer 5. Photoluminescent dyes, when they are excited by the external light source 4, emit light in different and longer wavelenghts. For example, Rhodamine B is a pink dye that, when irradiated with blue-green wavelengths, emits red-orange light. Less than 0.1% by weight of Rhodamine B can thus be added to the previously mentioned ink to produce a printable ink (with inkjet or other technologies) with luminescent properties (for example: GLYMO+SU8+DPDMS+BYK+PAG+Rhodamine B). This ink also has rheological properties that allow its printability by inkjet printing. However, this as well as other formulations of the ink may also be deposited by spin coating, serigraphy, and the like. Especially useful in this case of luminescent ink printing is the use of inkjet printing in order to be able to print drawings, logos, and/or indicators to create selective areas that are able to emit light.

If the photoluminescent layer 5 is deposited directly on the light guide 3, light comprising excitation wavelength(s) of the dye may be transmitted through the light guide coating 3 and reaches the photoluminescent layer or coating 5. The photoluminescent layer 5 will then absorb light and emit luminescence in all directions, thereby generating a lighting effect as shown in FIG. 3. Depending on the location of the photoluminescent layer 5, mirroring of the bottom part of the luminescent mark (e.g.: by metal evaporation or sputtering) could lead to higher intensity for a viewer since parts of the emitted light is reflected. A light reflecting element could therefore be provided on top of the base element 2, between the base element 2 and the cladding layer 6, between the cladding layer 6 and the light guide 3, and/or on the photoluminescent layer 5 to reflect light emitted by the photoluminescent layer 5 in a desired way.

Figure 4:
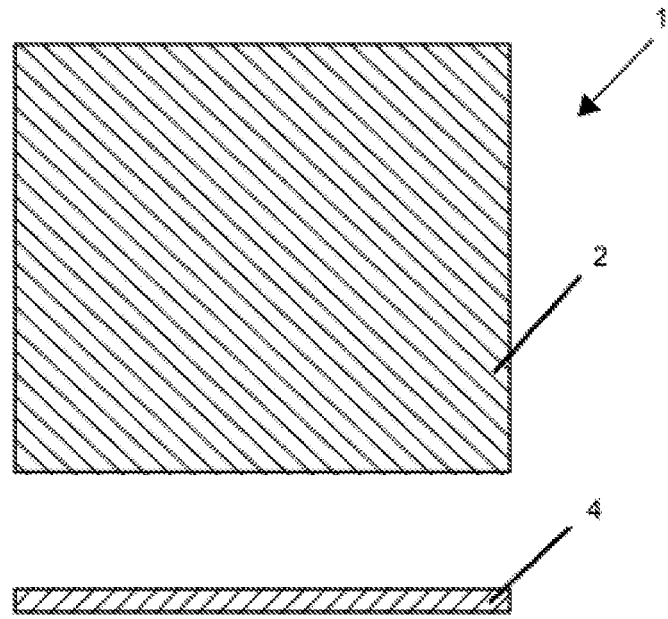
FIG. 4 a schematic top view of a household appliance component which is not according to the invention, but whose features can be used in embodiments of the present invention, wherein an associated light source is deactivated.
Figure 5:
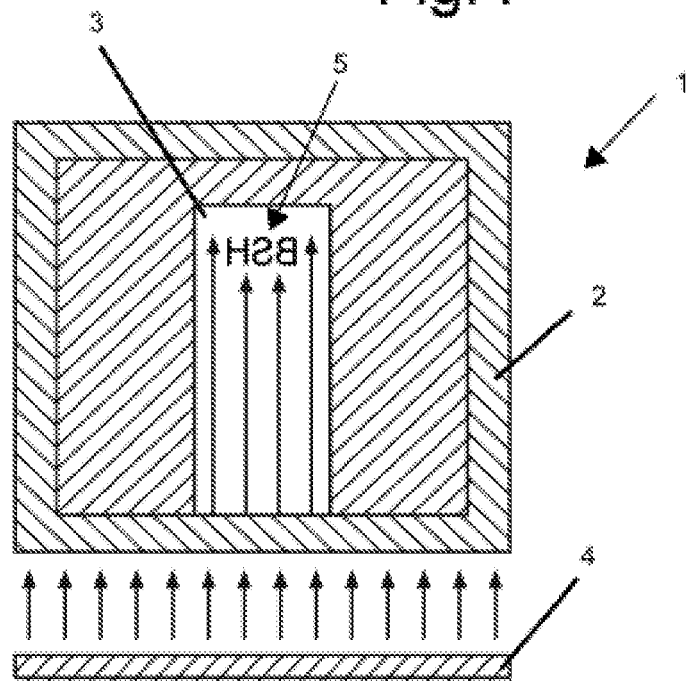
FIG. 5 a schematic bottom view of the household appliance component of FIG. 4, wherein the light source is activated.
Figure 6:
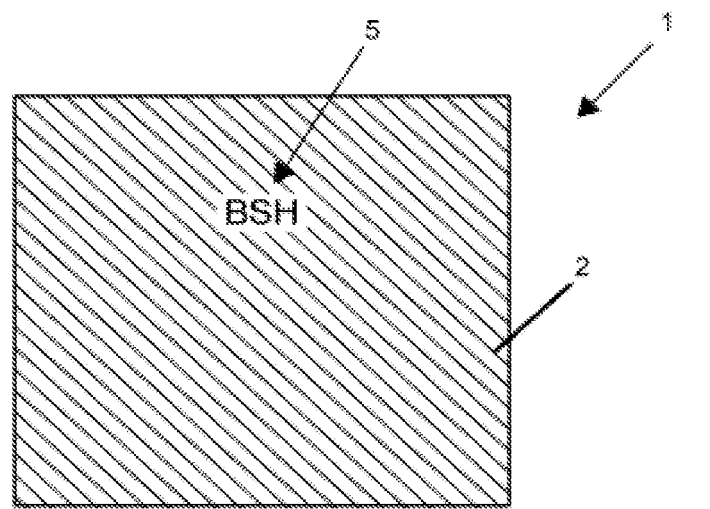
FIG. 6 a schematic top view of the household appliance component of FIGS. 4 and 5, wherein the light source is activated.
Figure 6:
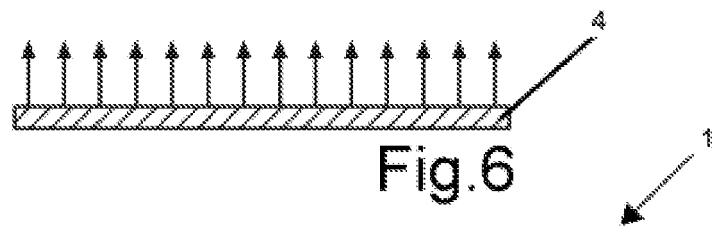

FIG. 4 shows a schematic top view of a household appliance component 1 which is also not according to the present invention, but whose features can be used in embodiments of the present invention. In FIG. 4, an associated light source 4 is deactivated. FIG. 4 will be discussed in synopsis with FIG. 5 and FIG. 6. FIG. 5 shows a schematic bottom view of the household appliance component 1 of FIG. 4, wherein the light source 4 is activated, while FIG. 6 shows a schematic top view of the household appliance component 1, wherein the light source 4 is activated. As can be gathered from FIG. 4, the top side or surface of the base element 2, which again is made of glass ceramic, has a uniform appearance if the light source 4 is deactivated. If the light source 4 is activated (FIG. 5, FIG. 6), light is transmitted via the transparent light guide 3, which is formed as a coating on the bottom or rear side of the base element 2, to the photoluminescent layer 5. The photoluminescent layer 5, which is produced by inkjet printing on the light guide 3, forms a mirror image of the letters "BSH" so that these letters can be viewed correctly on the top side of the household appliance component 1 (FIG. 6).

Since the described ink formulations for the light guide 3 and the cladding layer 6 are highly transparent, the luminescent ink is illuminated and emits light that can be seen through the light guide layer 3 and also through the glass (base element 2) if the emitted light is intense enough.

If the light source 4 emits blue or green (as is needed for the excitation of Rhodamine B), the glass or base element 2 can be provided with a respective filter, which selectively absorbs, scatters, and/or de-couples light having excitation wavelengths. Thus, only light emitted by the photoluminescent layer 5 is transmitted through the light guide 3 and the base element 2.

Figure 7:
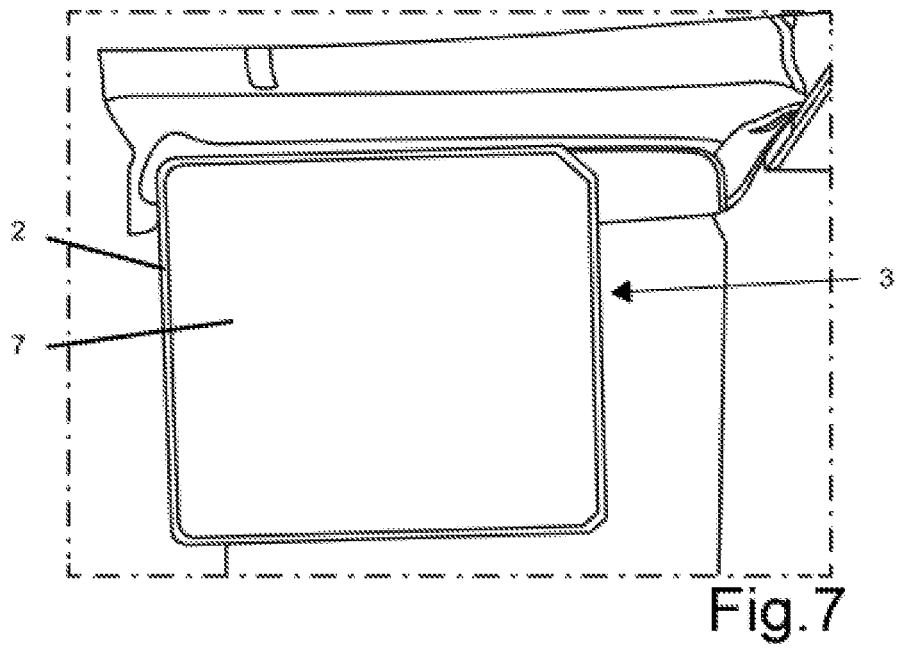
FIG. 7 a perspective view of a household appliance component which is not according to the invention, but whose features can be used in embodiments of the present invention, wherein an associated light source is deactivated.

FIG. 7 shows a schematic top view of a household appliance component 1 which is also not according to the present invention, but whose features can be used in embodiments of the present invention. Herein, an associated light source (not shown) is deactivated. The household appliance component 1 is designed as a ceramic heat plate. Instead of using a coating as the light guide 3, a photoluminescent ink has been printed directly on a base element 2, which is made of transparent glass and functions as the light guide 3. A dark glass plate is arranged as a color filter 7 for blue-green excitation light on top of the base element 2 to achieve a uniform appearance of the household appliance component 1 as long as the light source 4 is switched off.

Figure 8:
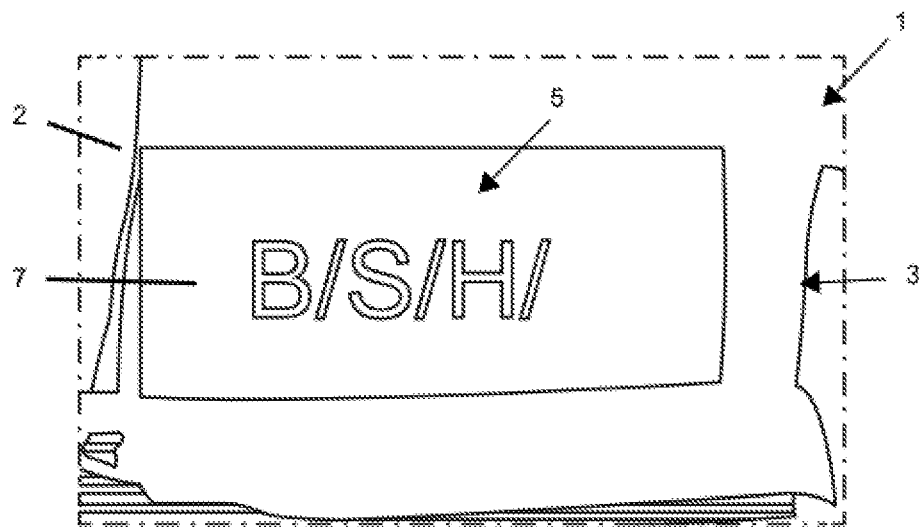
FIG. 8 a perspective view of the household appliance component of FIG. 7, wherein the light source is activated.

FIG. 8 shows a perspective view of the household appliance component 1 of FIG. 7, wherein the light source (not shown) is activated. The color filter 7 is permeable for red light so that the red emission from the photoluminescent layer 5, which forms the logo "B/S/H/" on the backside of the base element 2, can be clearly seen by a user.

Figure 9:
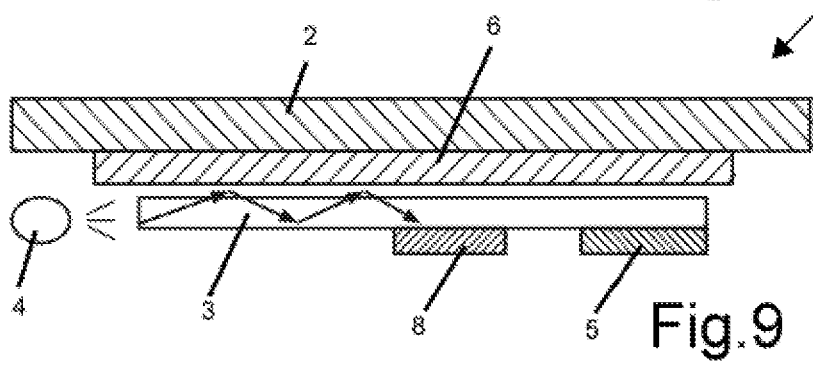
FIG. 9 a schematic sectional view of a household appliance component under cold temperature conditions according to a first non-limiting embodiment of the present invention.

FIG. 9 shows an embodiment of the present invention wherein an optical switch 8 is assigned to the light guide 3 to route light coupled in the light guide 3 depending on the temperature of the optical switch 8. In FIG. 9 a schematic sectional view of the household appliance component 1 is shown under cold temperature conditions. The basic structure of the household appliance component 1 has been discussed in connection with FIG. 3.

It is to be noted however that for the application in the present invention, an hybrid (organic-inorganic) material has been developed, which is composed of 3-glycidyloxy-propyltrimethoxysilane (GLYMO), approximately 2% acid photoinitiator (PAG) and between 0.05 and 0.1% of BYK-333 (silicone-containing surface additive for surface tension reduction). This material is used as a base ink due to its hybrid properties and is especially useful for inkjet printing. The photoinitiator may comprise or be a triarylsulphonium hexafluorophosphate salt having the formula

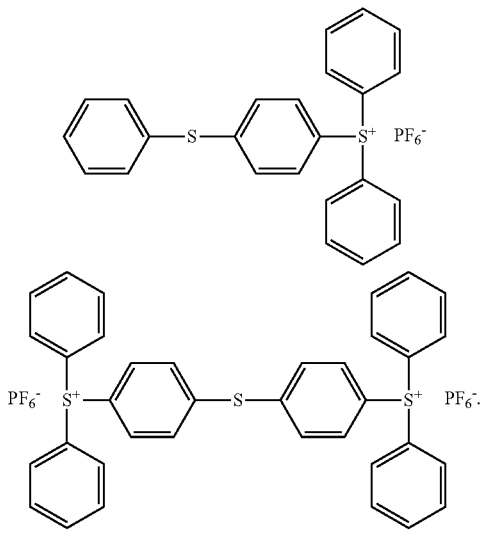

The presence of the epoxy group in the GLYMO guarantees fast curing properties, while the silane groups provide for adhesion on the glass substrate 2. Because of the PAG, a curing process in one step is possible: UV light reacts with the photoinitator and acid is generated so that both processes, polymerization of the epoxy groups and hydrolysis and condensation of the silanes are initiated and organic and inorganic networks are created. Also, depending on the needs, different additives can be added to modify the properties. This material is formulated in such a way that its rheological properties allow the deposition by inkjet printing or other coating technologies.

In order to increase the refractive index of this base ink, certain compounds can be added to the formulation such as SU8 having the formula

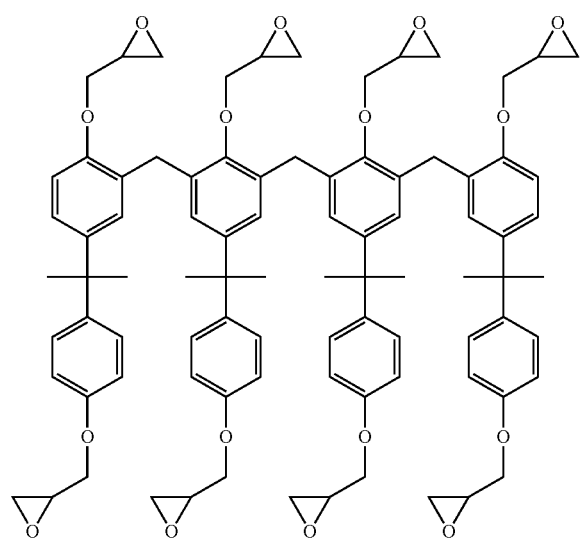 [SMILES: CC(C)(c1ccc(OCC2CO2)cc1)c1ccc(OCC2CO2)c(Cc2cc(C(C)(C)c3ccc(OCC4CO4)cc3)cc(Cc3cc(C(C)(C)c4ccc(OCC5CO5)cc4)cc(Cc4cc(C(C)(C)c5ccc(OCC6CO6)cc5)ccc4OCC4CO4)c3OCC3CO3)c2OCC2CO2)c1]

The use of this compound in the base ink increases the refractive index without negatively affecting the mechanical properties of the coating/light guide 3. For example, the refractive index of the light guide 3 could vary from 1.5 to 1.57 at 633 nm if SU8 is added in amounts ranging between 0% to 70% by weight, in particular between 0% and 25%.

Apart from SU8, other materials such as diphenyl dimethoxysilane (DPDMS) could be also be used to increase the refractive index and, due to is inorganic component, maintain the mechanical properties of the coating 3. Particularly useful are again between 0% and 25% by weight.

On the other hand, the refractive index of the light guide 3 and/or of the base element 2 may also be decreased. Since the refractive index of glass cannot be easily decreased, the cladding layer 6 is used as an intermediate coating between the base element 2 and the light guide coating 3. The cladding layer 6 has a lower refractive index than the light guide 3 so that the light guide 3 is surrounded by media, i.e. cladding layer 6 and air, with lower refractive indices so that light from the light source 4 can be guided.

The cladding layer 6 can also be deposited by different technologies, depending on the application and requirements, for example by screen printing, spin coating, or inkjet printing. Thereby the previously described base ink (GLYMO+PAG+BYK: good adherence and properties on glass and a refractive index of approx. 1.5) could be used to form the cladding layer 6. Subsequently an ink consisting of GLYMO+PAG+BYK+SU8 could be used to form the light guide 3, for example by coating. This light guide coating 3 will have a higher refractive index than the cladding layer 6 due to the addition of SU8 to the base ink. On the other hand, the light guide 3 will be compatible with the cladding layer 6 due to the fact that both materials basically have a very similar chemical composition. The ink used for the light guide 3 as well as the ink used for the cladding layer 6 is highly transparent for light in the visible region (approx. 400-800 nm).

Figure 10:
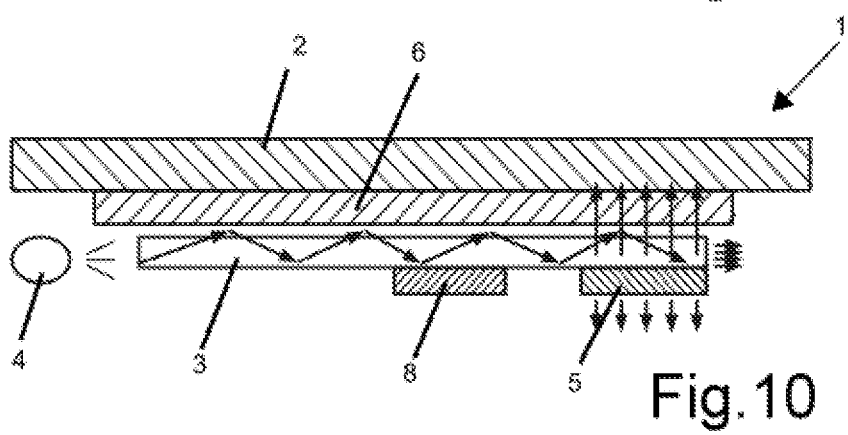
FIG. 10 a schematic sectional view of the household appliance component of FIG. 9 under warm temperature conditions.

The household appliance component 1 according to the present embodiment of the invention comprises an optical switch 8. The optical switch 8 consists of material that changes its optical transmission properties with temperature so that the household appliance component 1 can be used for applications in need of temperature indicators. The material of the optical switch 8 according to the present embodiment changes between a translucent state (low temperatures, FIG. 9) and a transparent state (high temperatures, FIG. 10). In other words, the material is translucent under cold temperature conditions and transparent under warm temperature conditions.

The optical switch 8 material is deposited as a coating over the light guide 3. Under cold temperature conditions, the optical switch 8 is translucent (FIG. 9) so that the coupled-in light is diffused by the optical switch 8 and is coupled out of the light guide 3. The light thus cannot excite the photoluminescent layer 5 even if the light source 4 is switched on.

On the other hand, if the temperature is high, the optical switch 8 becomes transparent (FIG. 10) so that coupled-in light will be transmitted by the light guide 3 to the photoluminescent layer 5, which is excited and emits light. Depending on the properties of the optical switch 8 it is also possible to generate an emission intensity dependence of the photoluminescent layer 5 with temperature, e.g. warm—high intensity emission, cold—low or no light emission.

It has to be stressed that the photoluminescent layer 5 can be spaced apart or physically separated from (potentially) hot area(s) of the household appliance component 1 because of the optical switch 8. Thus, exposition of the photoluminescent layer 5 to high temperatures and degradation of same can be avoided. In addition, the hot area(s) of the household appliance component 1 can be covered during use, e.g. by a pot or the like, and may therefore not be immediately visible for a viewer so that a certain distance between the (covered) hot region and the (uncovered) luminescent mark is also of advantage.

It is thus possible to separate the light source 4 and the desired visual effect due to physical construction limits, temperature limits, and the like. Further it is possible to design different illumination effects using one and the same light source 4. Since the light effect is effected by the photoluminescent layer 5 upon excitation, any drawing and shape can generally be realized. It is also possible to generate temperature dependent warning effects without the need to place the photoluminescent layer 5 in close vicinity of the corresponding high temperature areas.

The temperature dependant material used for manufacturing of the optical switch 8 may contain a liquid crystal polymer (LCP). As an example composition to prepare a material with thermal dependence of its optical transmission properties, a mixture of a reactive monomer consisting of a liquid crystal monoacrylate (6-(4-cyanobiphenyl-4'-yloxy)hexyl acrylate), a difunctional liquid crystal diacrylate (RM82) to crosslink the polymeric system, and a photoinitiator (IRG184) to trigger the polymerization reaction can be used:

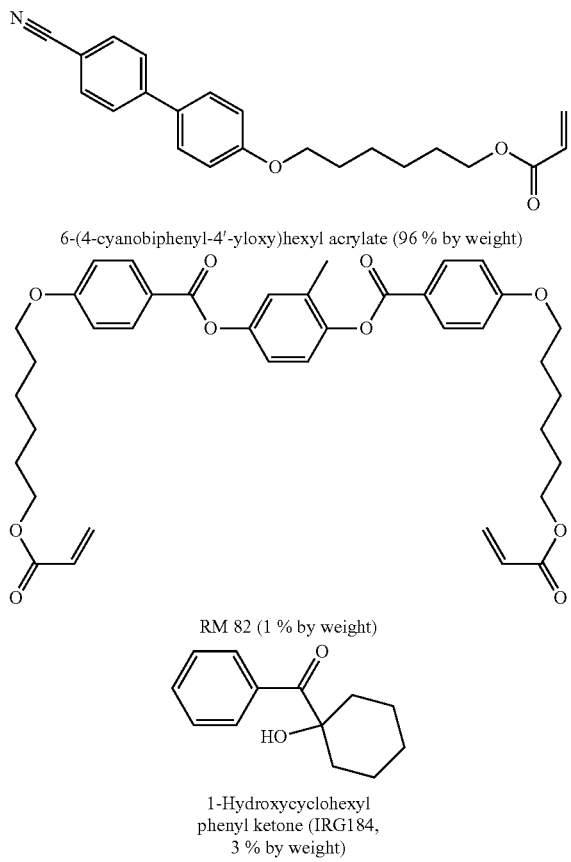

6-(4-cyanobiphenyl-4'-yloxy)hexyl acrylate (96 % by weight)

RM 82 (1 % by weight)

1-Hydroxycyclohexyl phenyl ketone (IRG184, 3 % by weight)

The composition is applied on the light guide 3 and UV polymerized in the isotropic state just above the clearing point of the low molecular liquid crystal mixture to promote upon photopolymerization the formation of a highly scattering multidomain texture, i.e. the optical switch 8. The turbid or translucent appearance of the coating changes to transparent when heated at 120-130° C. or above. The switching temperature can be adjusted as needed by modulating the composition and processing conditions.

Figure 11:
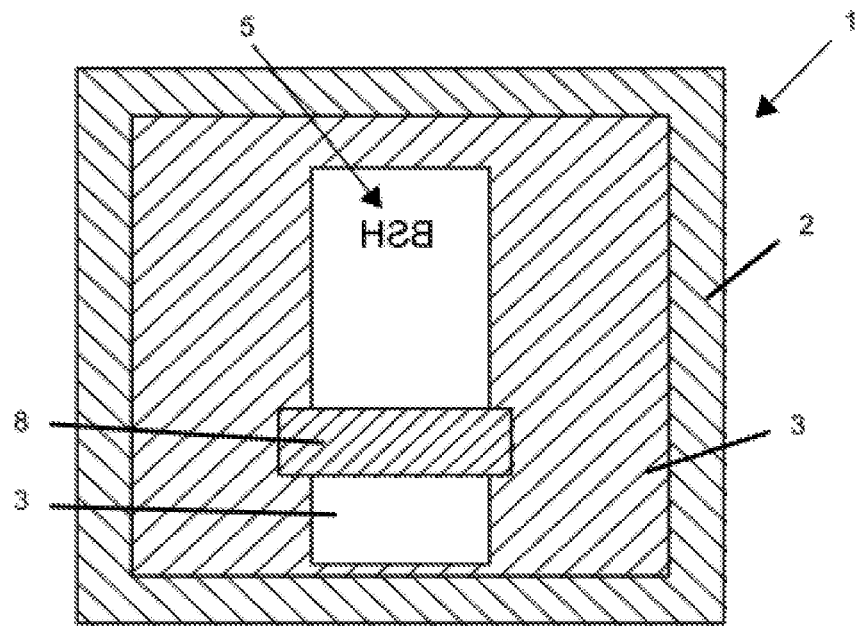
FIG. 11 a schematic bottom view of the household appliance component according to a further embodiment of the invention.
Figure 12:
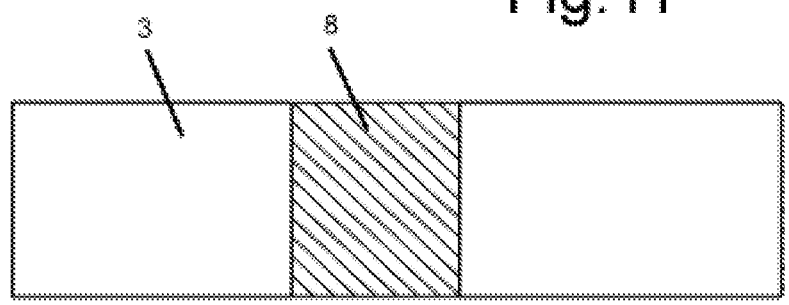
FIG. 12 a schematic top view of a light guide which is equipped with an optical switch, wherein the optical switch is in a translucent state.
Figure 13:
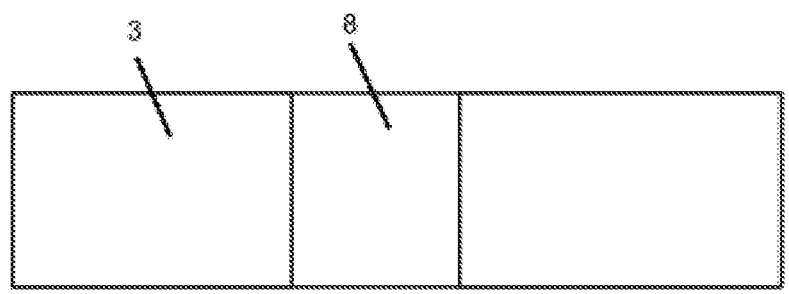
FIG. 13 a schematic top view of the light guide, wherein the optical switch is in a transparent state.

FIG. 11 shows a schematic bottom view of the household appliance component 1 according to a further embodiment of the invention. The household appliance component 1 comprises a transparent base element 2 with a cladding layer 6, a light guide layer 3 on top of the cladding layer 6, and an inkjet printed photoluminescent layer 5 in the form of the mirrored letters "BSH". Further, an optical switch 8 is located spaced apart from the photoluminescent layer 5. The optical switch 8 can again be switched between a translucent state, which is shown in more detail in FIG. 12, and a transparent state, which is shown in more detail in FIG. 13. Thus, light can be coupled out of the light guide 3 without exciting the photoluminescent layer 5 or can be transmitted through the light guide 3 to the photoluminescent layer 5 as required. Further, depending on the embodiment of the optical switch 8, the light flux through the optical switch 8 can be adjusted stepless between a predetermined minimum and maximum value in order to generate different brightness levels.

It will be understood by those skilled in the art that while the present invention has been disclosed above with reference to preferred embodiments, various modifications, changes and additions can be made to the foregoing invention, without departing from the scope of the invention as described in the appended claims. The parameter values used in the claims and the description for defining process and measurement conditions for the characterization of specific properties of the invention are also encompassed within the scope of deviations, for example due to measurement errors, system errors, weighing errors, DIN tolerances and the like.

LIST OF REFERENCES

1 household appliance component
2 base element
3 light guide
4 light source
5 photoluminescent layer
6 cladding layer
7 color filter
8 optical switch

The invention claimed is:
1. A household appliance component, comprising
a base element;
at least one photoluminescent layer supported by said base element;
at least one light guide configured to couple in and transmit light having at least one excitation wavelength of said photoluminescent layer to said photoluminescent layer; and
an optical switch assigned to said light guide to route the light coupled in said light guide depending on a temperature of said optical switch.
2. The household appliance component according to claim 1, wherein said light guide is a planar waveguide.
3. The household appliance component according to claim 1, wherein:
said light guide is a light guide element which is coupled to said base element; and/or
at least a part of said base element is said light guide; and/or
said light guide is a light guiding layer of said base element.

4. The household appliance component according to claim 3, wherein:
said photoluminescent layer forms at least a part of said light guiding layer; and/or
said light guiding layer is produced by at least one coating method.

5. The household appliance component according to claim 1, wherein said photoluminescent layer is produced by at least one coating method.

6. The household appliance component according to claim 1, wherein said light guide has a higher refractive index than adjacent material along a waveguide path.

7. The household appliance component according to claim 1,
further comprising a cladding layer, said light guide is at least partly disposed on said cladding layer; or
further comprising two cladding layers, said light guide is at least partly disposed between said two cladding layers; or
further comprising a cladding layer, said light guide being at least partly embedded in said cladding layer; or
wherein said light guide is at least partly disposed between said base element and said photoluminescent layer; or
further comprising a cladding layer, said light guide is at least partly disposed between said cladding layer and said photoluminescent layer.

8. The household appliance component according to claim 1,
further comprising a cladding layer; and
wherein said base element and/or said photoluminescent layer and/or said light guide and/or said cladding layer is transparent for light of a visible wavelength and/or contains a hybrid polymer.

9. The household appliance component according to claim 8, wherein said hybrid polymer is obtainable by polymerization of a reaction mixture containing an alkoxysilane with an epoxy group.

10. The household appliance component according to claim 9, wherein said hybrid polymer is obtainable by polymerization of said reaction mixture comprising in % by weight the following chemical compounds:
1-99% 3-glycidyloxypropyltrimethoxysilane;
0.1-5% photoacid generator;
0-2% surfactant;
0-70% refractive index increasing compound;
0-10% photoluminescent material; and
0-10% additive.

11. The household appliance component according to claim 1, further comprising:
at least one reflecting element which is configured to reflect light emitted by said photoluminescent layer; and/or
at least one absorption element which is configured to absorb, scatter and/or quench the light emitted by said photoluminescent layer; and/or
at least one decoupling element which is configured to decouple the light from said light guide.

12. The household appliance component according to claim 1, wherein said optical switch has at least one liquid crystal polymer.

13. The household appliance component according to claim 12, wherein said liquid crystal polymer of said optical switch is obtainable by copolymerizing:
(a) 10-100% by weight monofunctional mesogen, based on monomers;
(b) 0-10% by weight difunctional mesogen based on the monomers; and
in a presence of a photoinitiator based on the monomers.

14. The household appliance component according to claim 1, wherein said light guide is a slab waveguide.

15. The household appliance component according to claim 4, wherein said coating method is selected from the group consisting of spin coating, spray coating, dip coating, serigraphy and inkjet printing.

16. The household appliance component according to claim 5, wherein said coating method is selected from the group consisting of spin coating, spray coating, dip coating, serigraphy and inkjet printing.

17. The household appliance component according to claim 10, wherein:
said photoacid generator is a triarylsulphonium salt;
said surfactant is polyether-modified polydimethylsiloxane;
said refractive index increasing compound is SU8 and/or diphenyl dimethoxysilane; and
said photoluminescent material is Rhodamine B.

18. The household appliance component according to claim 13, wherein:
said monofunctional mesogen is 6-(4-cyanobiphenyl-4'-yloxy)hexyl acrylate;
said difunctional mesogen is a diacrylate based on the monomers; and
said photoinitiator is an amount of up to 5% by weight.

19. The household appliance component according to claim 13, wherein said difunctional mesogen is a difunctional liquid crystal diacrylate.

20. A household appliance, comprising:
at least one household appliance component according to claim 1.

21. A household appliance component, comprising
a base element;
at least one photoluminescent layer supported by said base element;
at least one light guide configured to couple in and transmit light having at least one excitation wavelength of said photoluminescent layer to said photoluminescent layer; and
an optical coating disposed on said light guide to route the light coupled in said light guide depending on a temperature of said optical coating, the temperature changing optical transmission properties of said optical coating.

* * * * *